United States Patent
Golab et al.

(10) Patent No.: US 9,292,566 B2
(45) Date of Patent: Mar. 22, 2016

(54) PROVIDING A MEASURE REPRESENTING AN INSTANTANEOUS DATA CONSISTENCY LEVEL

(75) Inventors: Wojciech Golab, Mountain View, CA (US); John Johnson Wylie, Santa Clara, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 393 days.

(21) Appl. No.: 13/561,482

(22) Filed: Jul. 30, 2012

(65) Prior Publication Data

US 2014/0032504 A1    Jan. 30, 2014

(51) Int. Cl.
*G06F 17/30* (2006.01)

(52) U.S. Cl.
CPC .... *G06F 17/30424* (2013.01); *G06F 17/30371* (2013.01)

(58) Field of Classification Search
CPC . G06F 11/2064; G06F 11/1471; G06F 17/30; G06F 17/30368; G06F 17/30306; G06F 17/30371; G06F 17/30351
USPC ........................................................ 707/690
See application file for complete search history.

(56) References Cited

U.S. PATENT DOCUMENTS

| | | | |
|---|---|---|---|
| 8,396,840 B1 * | 3/2013 | McHugh et al. | 707/690 |
| 8,554,737 B2 * | 10/2013 | Jennas et al. | 707/649 |
| 8,589,360 B2 | 11/2013 | Li | |
| 2007/0239800 A1 * | 10/2007 | Eberlein | G06F 17/30351 |
| 2007/0276873 A1 * | 11/2007 | Vahdat et al. | 707/200 |
| 2008/0319878 A1 * | 12/2008 | Glebe | G06Q 10/00 705/28 |
| 2011/0252067 A1 | 10/2011 | Marathe | |
| 2013/0097130 A1 * | 4/2013 | Bingol et al. | 707/694 |
| 2013/0151467 A1 * | 6/2013 | Krishnan et al. | 707/611 |
| 2013/0151478 A1 * | 6/2013 | Li | G06F 17/30371 707/690 |

OTHER PUBLICATIONS

Vogels, W., All Things Distributed, Dec. 20, 2007 (5 pages).*
Bailis et al., Probabilistically Bounded Staleness for Practical Partial Quorums, Electrical Engineering and Computer Sciences, University of California at Berkeley, Technical Report No. UCB/EECS-2012-4, Jan. 2012 (14 pages).
Li et al., U.S. Appl. No. 13/323,577 entitled Verifying Consistency Levels filed Dec. 12, 2011 (30 pages).
Anderson, E., et al., What consistency does your key-value store actually provide? Oct. 2010 (6 pages).
Escriva, R. et al., Hyperdex: a Distributed, Searchable Key-value Store, Aug. 13-17, 2012 (12 pages).
Abadi, D. Consistency tradeoffs in modern distributed database system design: CAP is only part of the story, IEEE Computer 45,2 (2012), 37-42.
Aiyer, A et al., On the availability of non-strict quorum systems, In 19th International Symposium on Distributed Computing (2005), DISC'05, pp. 48-62.
Bailis, P., et al., Probabilistically bounded staleness for practical partial quorums, Proc. VLDB Endow. 5,8 (Apr. 2012), 776-787.

(Continued)

*Primary Examiner* — Michelle Owyang
(74) *Attorney, Agent, or Firm* — Trop, Pruner & Hu, P.C.

(57) ABSTRACT

Based on events corresponding to operations performed with respect to a data store, a measure is computed that represents an instantaneous consistency level, at a point in time, of data that is subject to the operations.

18 Claims, 3 Drawing Sheets

(56) References Cited

OTHER PUBLICATIONS

Bermbach et al., Eventual consistency: How soon is eventual? an evaluation of amazon s3's consistency behavior, In Proceedings of the 6th Workshop on Middleware for Service Oriented Computing, MW4SOC '11, ACM, pp. 1:1-1:6.

Brewer, E. A., Towards robust distributed systems (Invited Talk),. In 29th ACM SIGACT-SIGOPS symposium on Principles of distributed computing (2010) (12 pages).

Cooper et al., Benchmarking cloud serving systems with YCSB, In Proc. SoCC, 2010, ACM, pp. 143-154.

Fox et al., Harvest, yield, and scalable tolerant systems, In Proceedings of the The Seventh Workshop on Hot Topics in Operating Systems, HOTOS '99, IEEE Computer Society, pp. 174-178.

Gibbons et al., Testing shared memories. SIAM J. Comput. 26,4 (1997), 1208-1244.

Golab et al., Analyzing consistency properties for fun and profit, In Proceedings of the 30th annual ACM SIGACT-SIGOPS symposium on Principles of distributed computing, 2011, PODC'11, ACM, pp. 197-206.

Herlihy et al., Linearizability: A correctness condition for concurrent objects, ACM Toplas 12,3 (Jul. 1990), 463-492.

Hunt et al., ZooKeeper: wait-free coordination for internet-scale systems, In Proceedings of the 2010 USENIX Annual Technical Conference (Berkeley, CA, USA, 2010), USENIXATC'10, USENIX Association, pp. 11-25.

Klems et al., Consistency benchmarking: Evaluating the consistency behavior of middleware services in the cloud. In Service-Oriented Computing, Eds., vol. 6470 of Lecture Notes in Computer Science, 2010, pp. 627-634.

Krishnamurthy et al., An adaptive quality of service aware middleware for replicated services, IEEE Transactions on Parallel and Distributed Systems 14 (2003), 1112-1125.

Lamport, L. On interprocess communication, Part I: Basic formalism, Distributed Computing 1, 2 (1986), 77-85.

Lloyd et al., Don't settle for eventual: Scalable causal consistency for wide-area storage with COPS, In Proc. 23rd ACM Symposium on Operating Systems Principles (SOSP 11) (Cascais, Portugal, Oct. 2011) (1 pages).

Lynch et al., Brewer's conjecture and the feasibility of consistent, available, partition-tolerant web services. ACM SIGACT News 33, 2 (Jun. 2002), 51-59.

Papadimitriou, C. H. The serializability of concurrent database updates. J. ACM 26, 4 (1979), 631-653.

Patil et al., Ycsb++:benchmarking and performance debugging advanced features in scalable table stores. In Proceedings of the 2nd ACM Symposium on Cloud Computing (New York, NY, USA, 2011), SOCC'11, ACM, pp. 9:1-9:14.

Shapiro, M., Preguic, A, N. M., Baquero, C., and Zawirski, M. Convergent and commutative replicated data types. Bulletin of the EATCS 104 (2011), 67-88.

Terry et al., Managing update conflicts in bayou, a weakly connected replicated storage system. In Proceedings of the fifteenth ACM Symposium on Operating Systems Principles 1995, SOSP'95, ACM, pp. 172-182.

Terry, D. Replicated data consistency explained through baseball. Tech. Rep. MSR-TR-2011-137, Microsoft Research, Oct. 2011 (14 pages).

Wada et al., Data consistency properties and the trade-offs in commercial cloud storage: the consumers' perspective. In CIDR (2011), pp. 134-143.

Yu et al., Design and evaluation of a conit-based continuous consistency model for replicated services, ACM Trans. Comput. Syst. 20, 3 (Aug. 2002), 239-282.

Yu et al., The costs and limits of availability for replicated services, In Proceedings of the eighteenth ACM symposium on Operating systems principles, 2001, SOSP'01, ACM, pp. 29-42.

Zhang, C., and Zhang, Z. Trading replication consistency for performance and availability: an adaptive approach, in ICDCS (2003), pp. 687-695.

Zhu, Y., and Wang, J., Client-centric consistency formalization and verification for system with large-scale distributed data storage, Future Gener. Comput. Syst. 26, 8 (Oct. 2010), 1180-1188.

Vogels, W. Eventually consistent, Communications of the ACM, vol. 52, No. 1, Jan. 2009 (5 pages).

\* cited by examiner

PROVIDING A MEASURE REPRESENTING AN INSTANTANEOUS DATA CONSISTENCY LEVEL

BACKGROUND

Key-value storage systems are increasingly becoming more popular for storing data. Generally, a key-value storage system stores data values in storage locations that are indexed, identified, or otherwise referred to by a key. A key-value storage system differs from a traditional relational database management system in that the key-value storage system does not employ data models or schemas used for defining the data structures of relational tables that are found in relational database management systems.

Data can be retrieved from a key-value storage system more quickly than from a relational database management system. However, a key-value storage system may not guarantee data consistency—in other words, under certain conditions, data retrieved may not be up-to-date.

BRIEF DESCRIPTION OF THE DRAWINGS

Some embodiments are described with respect to the following figures.

DETAILED DESCRIPTION

Figure 1:
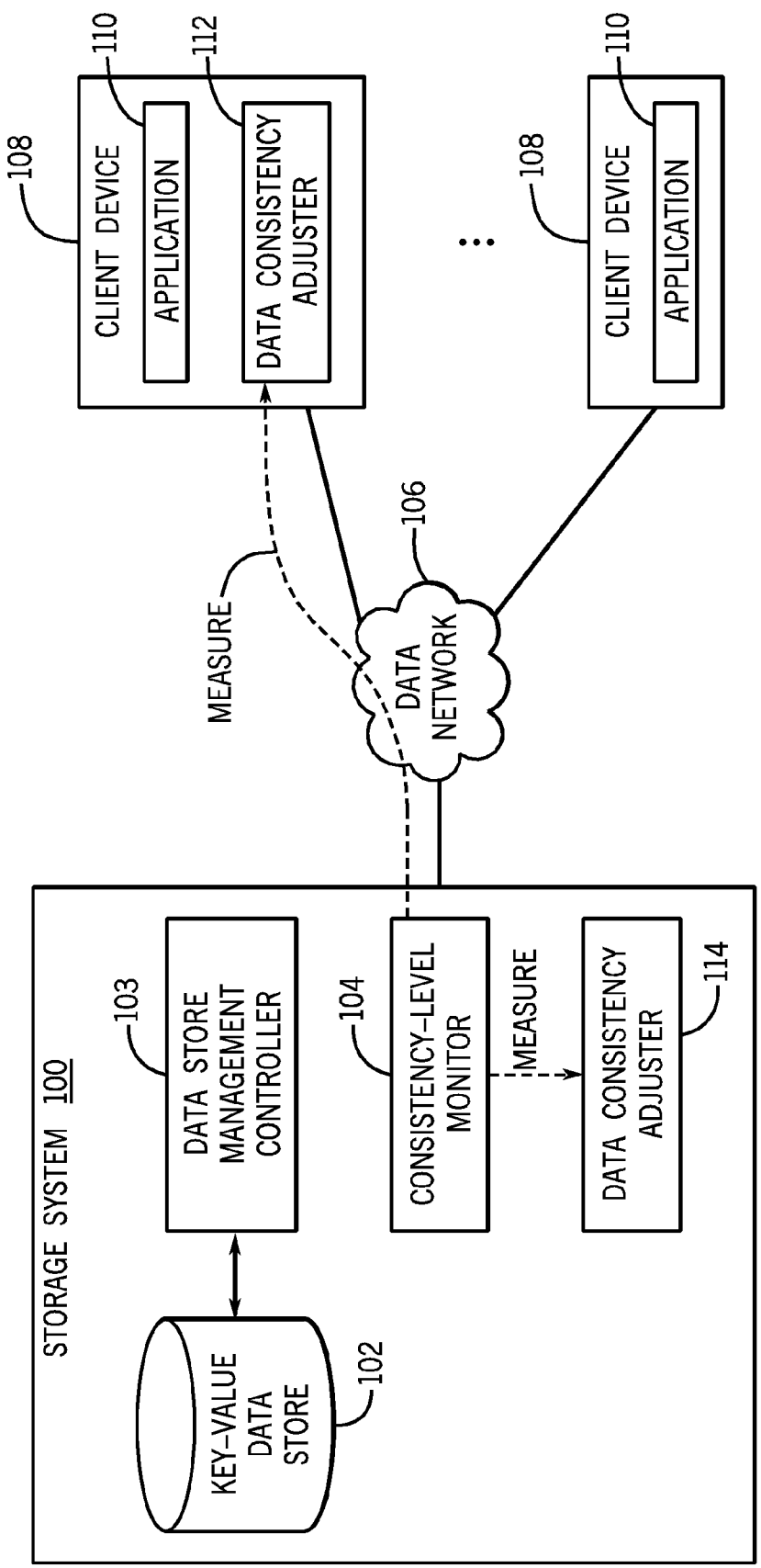
FIG. 1 is a block diagram of an example arrangement that includes a storage system having a consistency-level checking monitor, according to some implementations.

A key-value storage system can provide reduced latency (lower access times) to users, applications, or other requestors when accessing data. A key-value storage system is also relatively scalable, in that capacity can be added relatively easily to the key-value storage system by adding additional server nodes or other resources, for example. To achieve improved scalability and improved performance, data consistency can be relaxed in a key-value storage system. Relaxed data consistency can lead to retrieving data that may not be up-to-date under certain conditions.

In some industries or applications, a user may desire the most up-to-date data in a data store, which may not be possible at all times with a key-value storage system with relaxed data consistency. In some examples, a control element (referred to as a "tuning knob") can be provided to allow users to adjust a target data consistency level of a data store, such as in a key-value storage system. If a user sets the tuning knob to a conservative value, enhanced data consistency may be achieved, but this may come at the expense of increased storage and computation resource consumption as well as increased latency in the storage system.

In accordance with some implementations, techniques or mechanisms allow the flexibility of automated adjustment of a data consistency level at a requesting entity, rather than at the storage system. A requesting entity can include an application or a machine from which a data request was submitted (such as to read data). Data consistency adjustment of a data consistency level can include enhancing the data consistency level or reducing the data consistency level. Enhancing the data consistency level can also be referred to as data consistency amplification.

In some examples, amplifying data consistency can be achieved by slowing down certain operations, such as read operations and/or write operations. For example, by slowing down a read operation (which means that the start time of the read operation is delayed by some defined amount), the likelihood of a prior write operation (which may be writing data that is requested by the read operation) completing is enhanced. In this way, the likelihood of the read operation retrieving fresher (or more up-to-date) data is enhanced. By being able to amplify data consistency at the requesting entity, a user can be provided with the illusion that a storage system from which data is being read has a higher data consistency level than the storage system actually has. By performing the data consistency amplification at the requesting entity, the storage system is not burdened with having to perform the data consistency amplification, which can lead to overall improved performance of the storage system.

Although reference is made to data consistency adjustment being performed at a requesting entity in some implementations, it is noted that data consistency adjustment can be performed at the storage system in other implementations.

In accordance with some implementations, data consistency adjustment (whether performed at the requesting entity or the storage system) can be based on measures that represent instantaneous data consistency levels of data at corresponding time points. By reporting different measures at different times, the data consistency adjustment can be varied over time.

Although reference is made to performing data consistency adjustment in response to instantaneous data consistency levels at instantaneous time points, it is noted that other types of actions can be performed in other examples. For example, fluctuations in data consistency levels over time can be visualized, such as by outputting a graph that shows data consistency levels over time, a report that lists data consistency levels at different time points, and so forth. In some examples, the measures representing the data consistency levels over time can also be displayed with other metrics of system performance.

As further examples, the measures representing instantaneous data consistency levels can also be used to enforce a consistency-based service level agreement (SLA), which can specify a target consistency level. For example, the target consistency level of an SLA can indicate that the data should be consistent (up-to-date) a predefined percentage of the time. The measures representing the instantaneous data consistency levels can be compared to the target consistency level to determine whether the SLA can be or has been satisfied.

In the ensuing discussion, reference is made to a storage system that has a key-value data store. In other examples, other types of data stores can be employed, where such other types of data stores can also have issues associated with fluctuating data consistency levels.

FIG. 1 is a block diagram of an example arrangement that includes a storage system 100 that has a key-value data store 102. The key-value data store 102 is coupled to a consistency-level monitor 104 (referred to as a "monitor" in the ensuing discussion). The monitor 104 can be part of the storage system 100, or alternatively, the monitor 104 can be in a system separate from the storage system 100. The storage system 100 also includes a data store management controller 103 that manages access of the key-value data store 102.

The storage system 100 is coupled over a data network 106 to various client devices 108. Each of the client devices 108 can have one or multiple applications 110 that execute in the respective client devices. Examples of the client devices 108 include computers (e.g. desktop computers, notebook computers, tablet computers), personal digital assistants (PDAs), smartphones, game appliances, and so forth.

Each application 110 is able to perform an operation (e.g. read operation, write operation, etc.) with respect to the key-value data store 102. An application 110 can send a request (e.g. a read request, a write request, etc.) to the data store management controller 103, which accesses the key-value data store 102 in response to the request.

At least one of the client devices 108 can include a data consistency adjuster 112, which can receive, from the monitor 104, a measure of a data consistency level at an instantaneous time point. Based on the measure, the data consistency adjuster 112 can adjust (e.g. amplify) a data consistency level at the client device 108. In alternative examples, a data consistency adjuster 114 can be provided in the storage system 100, which can receive a measure of instantaneous data consistency level from the monitor 104 to allow the data consistency adjuster 114 to adjust a data consistency level at the storage system 100.

Figure 2:
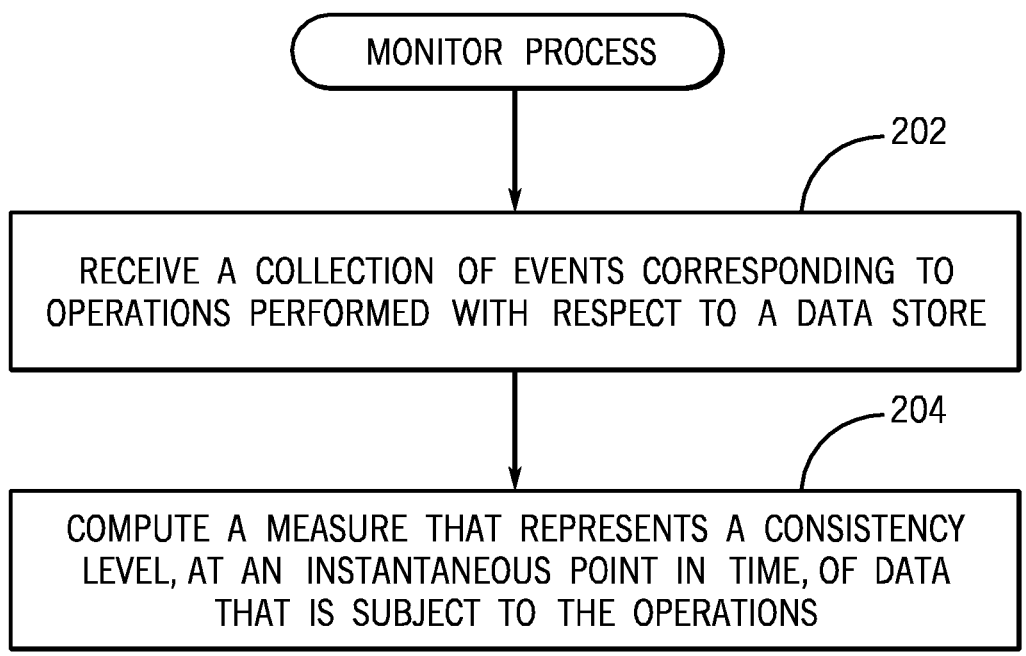
FIG. 2 is a flow diagram of a monitor process according to some implementations.

FIG. 2 is a flow diagram of a monitor process according to some implementations. The monitor process of FIG. 2 can be performed by the monitor 104 of FIG. 1, for example. The monitor 104 receives (at 202) a collection of events corresponding to operations performed with respect to the data store 102. The operations performed with respect to the data store 102 may include read operations, write operations, and so forth, in response to requests submitted by the client devices 108. The monitor 104 can monitor such operations to generate a respective collection of events. In some implementations, an "event" can refer to the start or finish of a read or write operation performed on a corresponding key, and can include the time at which the event occurred. In some examples, the monitor 104 has the ability to pair up start and finish events for the same operation. Note that some events of the collection can correspond to operations that may not have finished.

In accordance with some implementations, to produce the collection of events based on monitoring operations to the data store 102, timing information of the operations is collected by the monitor 104. Each operation (e.g. a read or a write operation) has a start time, finish time, and value. The value of a write operation is the value written to a storage location of the data store 102, and the value of a read operation is the value obtained by the read operation. Note that the value of a write operation is known at the start of the write, but the value of a read operation is known only at the finish of the read.

A key-value data store can be represented as a collection of read/write storage locations (e.g. registers), where each key identifies or refers to a storage location (e.g. register). A get request (to read data) and a put request (to write data) can be translated into read and write operations on the corresponding storage locations.

Although reference is made to receiving one collection of events in FIG. 2, it is noted that multiple collections of events can be received in other examples. Such multiple collections correspond to operations on corresponding keys (which refer to respective different storage locations in the data store). In some implementations, the monitor 104 does not collect a collection for every key. Moreover, for a given key, the monitor 104 does not have to collect a collection of events all the time. Random sampling of events may be sufficient in some implementations. In a high-availability storage system that has redundancy built in, it may be possible to perform read and write operations to allow events to be collected, even in the presence of failures.

In more specific examples, the collection of events can be a history of events, where a history of events refers to a sequence of events.

Based on the collection of events (such as a history of events), the monitor 104 computes (at 204) a measure that represents an instantaneous consistency level, at a particular point in time, of data that is subject to the operations corresponding to the events in the collection. Stated differently, the computed measure provides a quantification of a violation of atomicity by operations on the data store 102. Operations in a history are considered to be atomic if and only if there exists a valid total order on the operations such that every read returns the value of the latest write before the read in the total order. A valid total order means that if operation A ended before operation B began, then operation A should appear before operation B in the total order. This notion of atomicity is also referred to as strict serializability. Moreover, in some implementations, the computed measure can be used to verify whether a history including those operations satisfies a relaxed atomicity, which refers to a relaxation of a data consistency level to allow for stale data to be returned in response to a read.

In some implementations, to quantify a data consistency level of a history of events to compute the measure (at 204), a scoring function $\chi$ assigns a score to a pair of "zones." For a given history H, and a value v read or written in H, let C(v) denote the subset of operations that read or write v, called the "cluster for v." The "zone" for a value v, denoted by Z(v), is the closed interval of time from the minimum finish time of the operations in C(v) to the maximum start time of the operations in C(v). Zone Z(v) is referred to as a "forward zone" if the minimum finish time is less than the maximum start time. Zone Z(v) is referred to as a "backward zone" otherwise.

Figure 3:
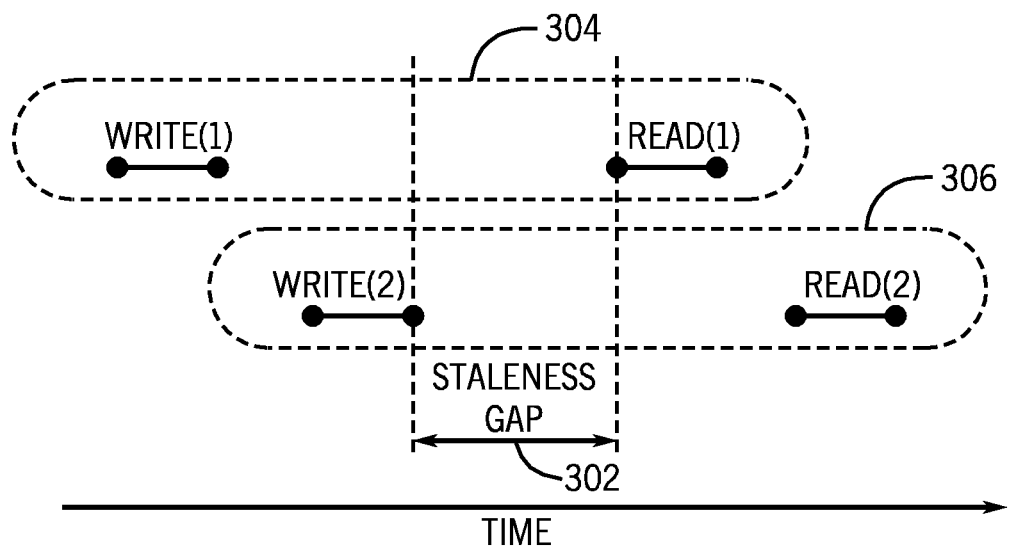
FIG. 3 is a timing diagram depicting operations of a history, in accordance with some implementations.

FIG. 3 depicts an example history H of operations that operate on a particular key k, in the sequence depicted in FIG. 3. The history H includes the following sequence of operations: write(v1) (write a value v1 to the storage location identified by the key k), write(v2) (write a value v2 to the storage location identified by the key k), read(v1) (read a value v1 at the storage location identified by the key k), and read(v2) (read a value v2 at the storage location identified by the key k). Since a write of value v2, write(v2), has completed by the time read(v1) returns the value v1, it is noted that read(v1) has returned a stale (out-of-date) value. In fact, the value returned by read(v1) is stale by at least the width of the gap 302 between write(v2) and read(v1).

Intuitively, in the example of FIG. 3, the score assigned by the scoring function $\chi$ is based on the width of the gap 302. In some examples, the score assigned by the scoring function $\chi$ is equal to the width of the gap 302. In other examples, the score can be derived based on the width of the gap 302.

In the example of FIG. 3, the operations write(v1) and read(v1) are part of a first cluster 304, referred to as C(v1), while the operations write(v2) and read(v2) are part of a second cluster 306, referred to as C(v2). For each cluster, a respective zone (as defined above) can be specified. For example, the two zones for C(v1) and C(v2) can be referred to as $Z_1$ and $Z_2$, respectively.

Two zones Z and Z' are said to conflict with each other if and only if they are two forward zones that overlap, or one is a backward zone and the other is a forward zone that contains the backward zone entirely. For any cluster C(v) in H, the "$\Delta$-relaxation" (for any non-negative real number $\Delta$) of the zone Z(v) for C(v), denoted $Z_\Delta$, is a zone obtained by taking all the read operations in C(v) and decreasing their start time by $\Delta$ time units. The foregoing definitions provide the basis for a possible way of quantifying consistency.

For any two zones Z and Z' in H, the scoring function $\chi(Z, Z')$ is defined as the smallest $\Delta$ such that $Z_\Delta$ and $Z_\Delta'$ do not conflict. The $\Delta$ value for a history H, denoted $\Delta(H)$, is the maximum of $\chi(Z, Z')$ for all pairs of zones Z and Z' in H. Intuitively, if $\Delta(H)=x$, then this means that reads in H return values that are x time units (where such x time units can be represented by the gap 302 in FIG. 3, for example) staler than the freshest values. In a sense, the score produced by the scoring function $\chi$ for two zones is the minimum value of $\Delta$ that eliminates any conflict between the zones.

If $\Delta(H)=0$, that means the operations in the history H are atomic. The operations in a history are atomic if and only if there exists a valid total order (discussed above) on the operations such that every read returns the value of the latest write before the read in the total order.

In some implementations, "instantaneous $\Delta$" at time point t in history H, denoted $\Delta(H, t)$, provides the measure of an instantaneous consistency level at a particular point in time in H. In contrast, $\Delta(H)$ itself captures the consistency of the history H as a whole. In some examples, the measure $\Delta(H, t)$ is set as follows: $\Delta(H, t)$ is the maximum $\chi(Z, Z')$ for any pair of zones Z and Z' in H such that Z and Z' overlap at time t. It follows that $\Delta(H)$ is the maximum of $\Delta(H, t)$ over all t. The foregoing provides a possible way of defining instantaneous consistency at time t. In other examples, other scoring functions can be used, which can lead to different definitions of instantaneous consistency at time t.

Note that although H is a history over a specific key, the value of $\Delta(H, t)$ may be representative of other keys as well. For example, keys in the same replica group may behave similarly with respect to consistency because operations on them tend to experience similar processing and network delays. A replica group refers to a set of keys that are associated with the same replication policy, for example, where the replication policy can specify a specific number of copies of data to be made, and a specific set of machines (e.g. storage devices) onto which the data (including copies) are to be stored. As a further example, in a range-partitioned key-value data store, for each key range the keys in that range are likely to reside in the same replica group.

In some examples, the monitor 104 can compute histories of events for a subset of the keys stored in the data store 102. For any such history H corresponding to a particular key, the monitor computes $\Delta(H, t)$ for various times t (e.g. at pre-specified time intervals). The monitor 104 outputs $\Delta(H, t)$ through its external interface (e.g. application programming interface or other interface), which can be received by a respective entity, such as the data consistency adjuster 112 or 114 of FIG. 1. The data consistency adjuster 112 or 114 can use the $\Delta(H, t)$ values to perform data consistency level adjustment, as discussed above.

In other examples, an entity receiving $\Delta(H, t)$ values can apply any of various analyses to the $\Delta(H, t)$ values. Alternatively, the receiving entity can display the $\Delta(H, t)$ values to understand data consistency fluctuations. As yet further examples, a receiving entity can test $\Delta(H, t)$ against a threshold and react accordingly, for example by warning a user that retrieved data may be stale.

In further examples, if the monitor 104 does not have a history H for a specific key k, it can answer a query seeking the instantaneous consistency level measure for k by reporting $\Delta(H', t)$, where H' is a history for some other key k' that behaves similarly to k in terms of consistency. For example, the key k' may be part of the same replica group as k, as discussed above.

The following provides further details regarding computation of the score output by the scoring function $\chi$. Computing $\chi$ can be understood by considering first the effect of decreasing the starting times of the reads in H by $\Delta$. For a zone that does not contain any reads, there is no effect. For a forward zone, which contains at least one read, the right endpoint of the zone shifts to the left, up to the time where the forward zone collapses into a single point. Once this time is reached, any further shift results in the zone becoming a backward zone. For any backward zone containing at least one read, the left endpoint of the zone shifts to the left, up to the time where the left endpoint coincides with the start of the dictating write. Beyond this time there is no effect. Thus, for a sufficiently large $\Delta$, all zones become backward zones, and there are no conflicts.

The scoring function $\chi(Z_1, Z_2)$ can be defined more precisely as described below. Let $Z_1 \cap Z_2$ denote the time interval corresponding to the intersection of $Z_1$ and $Z_2$, and let $|Z_1 \cap Z_2|$ denote the length of this intersection interval. Scores are assigned according to the following strategy:

1. If $Z_1 \sim Z_2$ (they are compatible and do not conflict with each other) then $\chi(Z_1, Z_2)=0$.

2. If $Z_1$, $Z_2$ are conflicting forward zones, then $\chi(Z_1, Z_2)=|Z_1 \cap Z_2|$. Applying this $\Delta$ to all of the reads has the effect of shifting the right endpoint of the zone that finishes earliest until either this zone becomes a backward zone, or its right endpoint meets the left endpoint of the other zone.

3. If $Z_1$ is a forward zone and $Z_2$ is a conflicting backward zone that contains at least one read and whose dictating write begins before $Z_1 \cdot \underline{f}$, then $\chi(Z_1, Z_2)=\min(Z_1 \cdot \overline{s} - Z_2 \cdot \underline{f}, Z_2 \cdot \overline{s} - Z_1 \cdot \underline{f})$. In the foregoing, $Z_1 \cdot \underline{f}$ represents the minimum finish time of the operations in the corresponding cluster C(1), $Z_1 \cdot \overline{s}$ represents the maximum start time of the operations in the corresponding cluster C(1), $Z_2 \cdot \underline{f}$ represents the minimum finish time of the operations in the corresponding cluster C(2), and $Z_2 \cdot \overline{s}$ represents the maximum start time of the operations in the corresponding cluster C(2). Stated differently, the score is the smaller of the differences between adjacent endpoints of the two zones. This shifts the right endpoint of the forward zone and the left endpoint of the backward zone by the smallest amount ensuring that the forward zone no longer contains the backward zone.

4. If $Z_1$ is a forward zone and $Z_2$ is a conflicting backward zone of any other kind, then $\chi(Z_1, Z_2)=Z_1 \cdot \overline{s} - Z_2 \cdot \underline{f}$. This shifts the right endpoint of the forward zone until the forward zone no longer contains the backward zone. Shifting the backward zone does not help.

In alternative examples, another time-based consistency measure can be based on a different value, termed here as $\lambda$. For a history H, let $H_\lambda$ be the history obtained from H by shifting both the start time and finish time of each read and write in the history. More specifically, the start event for each operation is shifted left by $\lambda$ time units, while the finish event is shifted right by $\lambda$ time units. In this case, H is found to be "$\lambda$-atomic" if an only if $H_\lambda$ is atomic.

Similar to the approach described for $\Delta$-atomicity, verifying consistency under $\lambda$-atomicity can include computing the smallest $\lambda \geq 0$ that makes a history $H_\lambda$ atomic. A scoring function $\chi(Z_1, Z_2)$ for two zones $Z_1$ and $Z_2$ can be defined as described as follows:

1. If $Z_1 \sim Z_2$, then $\chi(Z_1, Z_2)=0$.
2. If $Z_1$, $Z_2$ are conflicting forward zones, then $\chi(Z_1, Z_2)=|Z_1 \cap Z_2|/2$. Applying this λ to all operations has the effect of shifting the adjacent endpoints of the zones until the zones no longer overlap.
3. If $Z_1$ is a forward zone and $Z_2$ is a conflicting backward zone, then $\chi(Z_1, Z_2)=\min(Z_1 \cdot \overline{s} - Z_2 \cdot \underline{f}, Z_2 \cdot \overline{s} - Z_1 \cdot \underline{f})/2$. This shifts the endpoint of the forward zone and the endpoint of the backward zone that are closest to each other until the forward zone no longer contains the backward zone.

Figure 4:
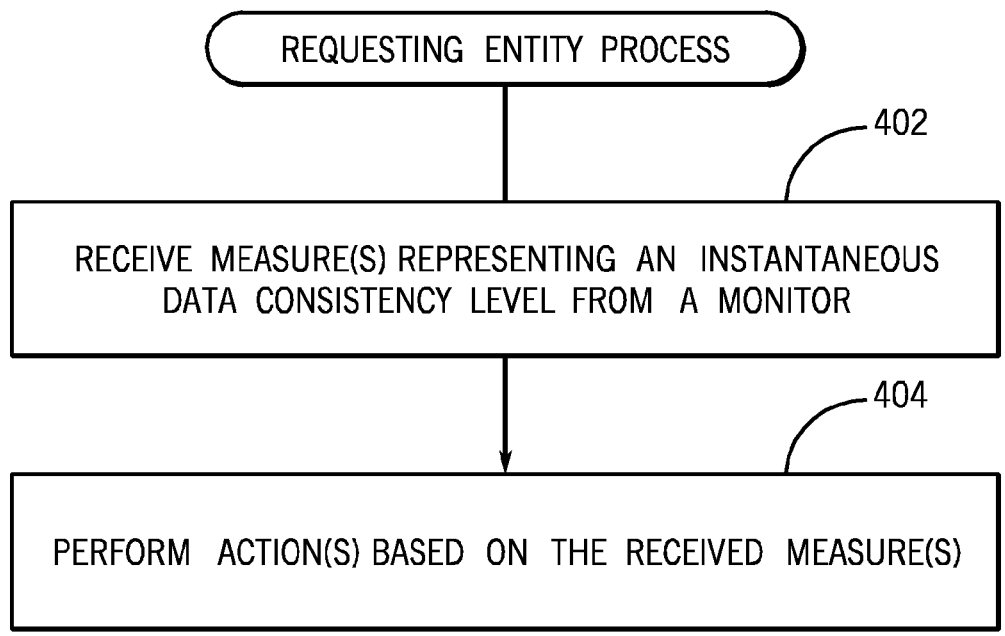
FIG. 4 is a flow diagram of a requesting entity process according to some implementations.

FIG. 4 is a flow diagram of a requesting entity process, which may be performed at the client device 108 or at any other machine that can issue requests to storage system 100 of FIG. 1. The requesting entity process receives (at 402) a measure representing an instantaneous data consistency level from the monitor 104 of FIG. 1. Note that in some examples, multiple measures of instantaneous data consistency levels at different time points can be received from the monitor 104.

In response to the received measure(s) representing respective instantaneous data consistency level(s), the requesting entity process performs (at 404) a particular action (or actions). For example, if the received measures indicate that the storage system 100 of FIG. 1 is providing relatively weak consistency (e.g. Δ(H, t) is positive), then the requesting entity can amplify data consistency, causing the corresponding user to observe stronger consistency than was available at the storage system 100. This can be done by slowing down read operations. If a different measure of instantaneous consistency is used, then it is possible to amplify consistency also by slowing down writes in addition to reads. Let U be an upper bound on the Δ(H, t) that can be defined during a user session or based on historical data. In some examples, the requesting entity slows down read operations as follows: after beginning a read, the requesting entity waits U time units, and then executes the read operation. It can be shown that as long as Δ(H, t) remains less than or equal to U, this technique yields atomic operations.

As another example, the action performed at 404 in FIG. 4 can be a verification that a target consistency level associated with a consistency-based SLA is satisfied. For example, the Δ(H, t) measures reported at multiple time points by the monitor 104 may indicate that Δ(H, t)=0 for X % of the time values t between the start time and end time of history H. Intuitively, this means that the storage system 100 is consistent X % of the time (for the key corresponding to H).

Alternately, an SLA may specify that a target eventual consistency is to be achieved by the storage system 100. For example, a storage system can be considered as being eventually consistent if and only if: for any execution where after some time Y there are no failures and the network is stable, there exists a time Y'≥Y such that for any Y"≥Y' and for any history H up to time Y", Δ(H, t) is less than some predefined threshold for all t such that Y'≤t≤Y". The notion here is that large consistency violations (e.g. large Δ(H, t) values) should occur only when there are failures, or periods where a server is overloaded and starts behaving as if it has failed. When the failures go away or are repaired, one would expect Δ(H, t) to go back down eventually to some relatively low level, such as after a few hundred milliseconds.

One can make eventual consistency even more precise by bounding the quantity Y'−Y, which represents the amount of time it takes the storage system to stabilize after failures. In this case, Y'−Y can represent the amount of time that it would take for the storage system to become eventually consistent.

As yet another alternative, an SLA may specify that a given percentage (e.g. X %) of data is strongly consistent, while the remainder (1−X %) of the data is eventually consistent.

Figure 5:
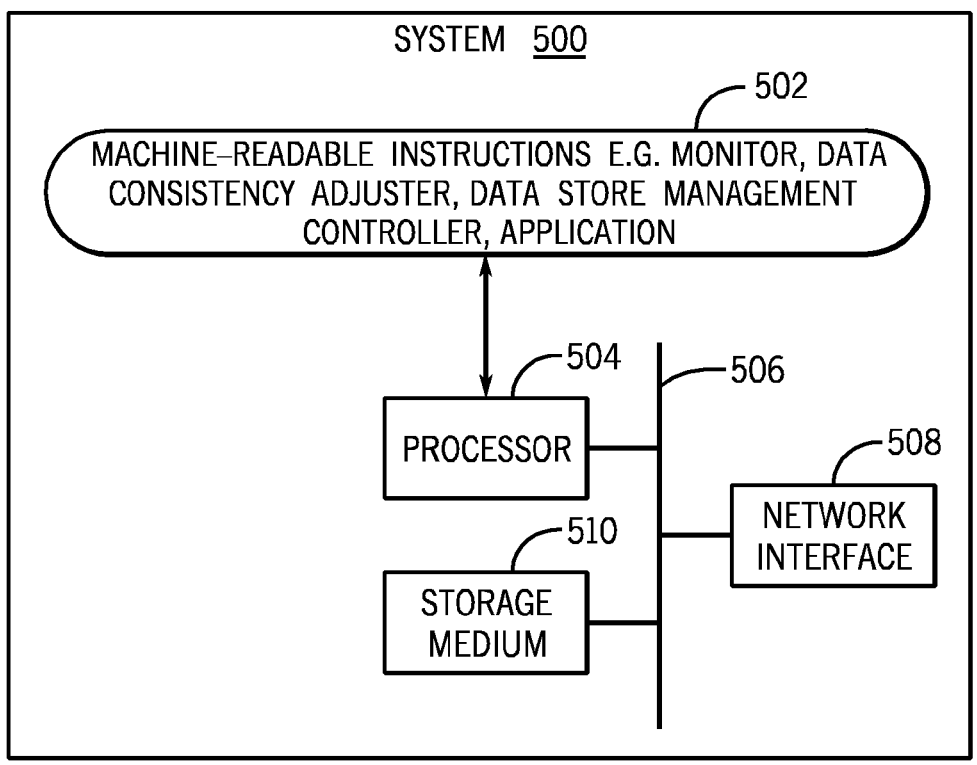
FIG. 5 is a block diagram of a system incorporating some implementations.

FIG. 5 is a block diagram of an example system 500, which can refer to either the storage system 100, a system including the monitor 104, or a client device 108. The system 500 includes machine-readable instructions 502, which can include any of the following: monitor 104, data consistency amplifier 112 or 114, data store management controller 103, and application 110. The machine-readable instructions 502 are executable on one or multiple processors 504. A processor can include a microprocessor, microcontroller, processor module or subsystem, programmable integrated circuit, programmable gate array, or another control or computing device.

The processor(s) 504 can be coupled over a system interconnect 506 to a network interface 508 and a storage medium (or storage media) 510. The network interface 508 can be used to communicate over a data network, such as data network 106.

The storage medium (or storage media) 510 can be implemented as one or multiple computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:
1. A method comprising:
  receiving, by a system having a processor, a collection of events corresponding to operations performed with respect to data of a data store;
  computing, by the system based on the collection of events, a measure that represents a consistency level, at an instantaneous point in time, of the data that is subject to the operations, the measure being based on a width of a time gap between a write to a particular storage location of the data store and a read of stale data from the particular storage location, the write and the read being part of the operations, wherein computing the measure comprises:
    changing a start time of read operations in each of a first cluster of the operations and a second cluster of the operations by a given time amount that removes a conflict between the first and second clusters; and using the given time amount to produce the measure; and
sending, by the system, the measure to an entity that amplifies a consistency level of the data of the data store in response to the measure.

2. The method of claim 1, wherein the entity is in the system.

3. The method of claim 1, wherein amplifying the consistency level of the data of the data store comprises the entity slowing down at least one read operation or at least one write operation.

4. The method of claim 1, further comprising computing, based on the collection of events, additional measures that represent corresponding consistency levels, at respective additional instantaneous points in time, of the data of the data store.

5. The method of claim 4, further comprising generating a visualization of the consistency levels over time.

6. The method of claim 1, further comprising:
determining whether the consistency level represented by the measure satisfies a service-level agreement that specifies a target level of data consistency.

7. The method of claim 1, wherein computing the measure based on the width of the time gap comprises setting the measure equal to the width of the time gap.

8. The method of claim 1, wherein the operations are partitioned into plural clusters including the first cluster of operations on a first data value, and the second cluster of operations on a second data value different from the first data value, wherein a zone in each respective cluster of the first and second clusters starts at a minimum finish time of the operations in the respective cluster and ends at a maximum start time of the operations in the respective cluster.

9. The method of claim 1, wherein each of the operations has a start time and a finish time, and wherein the collection of events includes events including the start times of the operations, and events including the finish times of the operations, and
wherein computing the measure is based on the start times and the finish times in the events of the collection of events.

10. An article comprising at least one non-transitory machine-readable storage medium storing instructions that upon execution cause a system to:
receive a measure from a monitor, the measure representing an instantaneous consistency level, at a point in time, of data that is subject to operations on a data store, wherein the measure is derived based on start times and finish times of the operations, wherein the measure is derived based on:
changing a start time of read operations in each of a first cluster of the operations and a second cluster of the operations by a given time amount that removes a conflict between the first and second clusters; and
using the given time amount to produce the measure; and
amplifying a consistency level of the data in the data store in response to the consistency level represented by the measure.

11. The article of claim 10, wherein the amplifying is performed at the system that is a requesting entity that submits requests to a storage system including the data store.

12. The article of claim 10, wherein the system contains information relating to a service level agreement that specifies a target consistency level, and wherein the instructions upon execution cause the system to further determine whether the measure satisfies the target consistency level.

13. The article of claim 10, wherein the operations are partitioned into plural clusters including the first cluster of operations on a first data value, and the second cluster of operations on a second data value different from the first data value, wherein a zone in each respective cluster of the first and second clusters starts at a minimum finish time of the operations in the respective cluster and ends at a maximum start time of the operations in the respective cluster.

14. A system comprising:
at least one processor to:
receive a collection of events corresponding to operations performed with respect to a data store;
compute, based on the collection of events, a measure that represents an instantaneous consistency level, at a point in time, of data in the data store that is subject to the operations, the measure being based on a width of a time gap between a write to a particular storage location of the data store and a read of stale data from the particular storage location, the write and the read being part of the operations, wherein computing the measure comprises:
changing a start time of read operations in each of a first cluster of the operations and a second cluster of the operations by a given time amount that removes a conflict between the first and second clusters; and
using the given time amount to produce the measure; and
send the measure to an entity that amplifies a consistency level of the data in the data store in response to the measure.

15. The system of claim 14, further comprising the data store, wherein the data store is a key-value data store.

16. The system of claim 14, wherein computing the measure based on the width of the time gap comprises setting the measure equal to the width of the time gap.

17. The system of claim 14, wherein the operations are partitioned into plural clusters including the first cluster of operations on a first data value, and the second cluster of operations on a second data value different from the first data value, wherein a zone in each respective cluster of the first and second clusters starts at a minimum finish time of the operations in the respective cluster and ends at a maximum start time of the operations in the respective cluster.

18. The system of claim 14, wherein each of the operations has a start time and a finish time, and wherein the collection of events includes events including the start times of the operations, and events including the finish times of the operations, and
wherein computing the measure is based on the start times and the finish times in the events of the collection of events.

* * * * *